US005802404A

United States Patent [19]
Nishimura

[11] Patent Number: 5,802,404
[45] Date of Patent: Sep. 1, 1998

[54] HELICOID-STRUCTURE

[75] Inventor: Syunji Nishimura, Ohmiya, Japan

[73] Assignee: Fuji Photo Optical Co., Ltd., Tokyo, Japan

[21] Appl. No.: 892,283

[22] Filed: Jul. 14, 1997

[30] Foreign Application Priority Data

Jul. 17, 1996 [JP] Japan .................... 8-205515

[51] Int. Cl.$^6$ .................... G03B 17/04; G02B 15/14; G02B 7/02
[52] U.S. Cl. .................... 396/72; 396/349; 359/694; 359/823; 359/829
[58] Field of Search .................... 396/72, 144, 349; 359/694, 823, 829; 285/390, 391; 411/311

[56] References Cited

U.S. PATENT DOCUMENTS

| 5,018,832 | 5/1991 | Terunuma et al. | 359/694 |
| 5,066,103 | 11/1991 | Kodaka et al. | 359/823 |
| 5,659,810 | 8/1997 | Nomura et al. | 396/72 |

Primary Examiner—W. B. Perkey
Attorney, Agent, or Firm—Price, Heneveld, Cooper, DeWitt & Litton

[57] ABSTRACT

A helicoid-structure characterized by width-enlarged parts formed by partially widening the respective troughs, which allow the crests to be linearly moved with the increment per unit rotational angle different from the increment per unit rotational angle with which the crests are linearly moved when they are guided by the troughs alone. In a specific embodiment, a stationary lens barrel is formed in its inner peripheral surface with three troughs, each describing a helical curve of appropriate length, on one hand, and a movable lens barrel is formed on its outer peripheral surface with three crests corresponding to the respective troughs each describing a helical curve of appropriate length, on the other hand. The respective troughs are partially widened transversely of the respective helical curves to form width-enlarged parts and a length of each width-enlarged part is dimensioned to be substantially equal to a length of each crest. When the crests move along the respective troughs and reach the respective width-enlarged parts, the respective crests shift transversely of the respective width-enlarged parts, whereupon an increment of linear movement per unit rotational angle with which the movable lens barrel linearly moves relative to the stationary lens barrel is varied.

13 Claims, 5 Drawing Sheets

HELICOID-STRUCTURE

BACKGROUND OF THE INVENTION

1. Field of the Invention

This invention relates to a helicoid-structure typically used to convert a rotational motion to the corresponding linear motion, for example, to convert a rotational motion of the lens barrel to a linear motion of the lens barrel along an optical axis for a desired focusing as is achieved by the zooming mechanism of a photographic camera.

2. Description of the Related Art

Similar to a screw-structure, the helicoid-structure comprises troughs helically formed in an inner peripheral surface of one component, such as in the form of an outer cylinder and crests correspondingly formed on an outer peripheral surface of another component, such as in the form of an inner cylinder so that these troughs and crests may cooperate to convert a rotational motion to a linear motion. As a typical example, such a helicoid-structure has usually been adopted for the photographic camera for zooming of the objective. Specifically, when it is desired to move the movable lens barrel along the optical axis back and forth relative to the stationary lens barrel, the stationary lens barrel is operatively associated with the movable lens barrel by the helicoid-structure so that the movable lens barrel may be rotated around the optical axis to guide the movable lens barrel by the helicoid-structure back and forth.

With the conventional helicoid-structure, the trough is substantially uniform in its width as well as its helical angle along its entire length from a proximal end to a distal end. Accordingly, when the inner cylinder, formed on its outer peripheral surface with the crests, is rotated relative to the outer cylinder, formed in its inner peripheral surface with the troughs, the linear movement of one cylinder relative to the other cylinder occurs substantially at a uniform increment per unit rotational angle by which the inner cylinder is rotated relative to the outer cylinder.

Recently, the photographic camera equipped with the zooming mechanism allowing the focal distance to be changed without exchanging the objective has become widely used and the manufacturers' efforts have been directed to make the camera of such type as compact as possible in order to improve its portability. One of the measures to achieve this is that the lens barrel which is used to hold the objective has usually been constructed so as to be retractable for carrying or storing the camera. With such a retractable-type lens barrel camera, the lens barrel can be retracted further from its photographically effective rearmost position, at which the objective is optically available for the effective function of photographing, until the forward end of the lens barrel becomes substantially flush with the front side of the camera in order to make the front side of the camera as planar as possible and at the same time to make the camera as thin as possible for the improvement of its portability.

However, with the conventional arrangement in which the lens barrel is moved back and forth by means of the helicoid-structure, as has been described above, the helicoid-structure also functions to retract the lens barrel further from its photographically effective rearmost position to its storage position at which the forward end of the lens barrel becomes substantially flush with the front side of the camera. Such linear motion of the lens barrel by means of the helicoid-structure occurs substantially at the uniform increment per unit rotational angle, and therefore the helicoid must be prolonged sufficiently to retract the lens barrel to the storage position. In other words, the helicoid-structure must cover the extent from the photographically effective forefront position to the storage position of the lens barrel. The length or diameter of the lens barrel must be dimensioned so as to allow such a helicoid-structure to be formed. It should be understood that, if it is desired to reduce the length of the helicoid-structure and thereby to shorten a distance by which the lens barrel linearly moves from its photographically effective rearmost position to its storage position, the front side of the camera must be advanced so as to be flush with the forward end of the lens barrel when the latter has been completely retracted, and this will make it difficult to obtain the camera as thin as desired.

As will be apparent from the foregoing description, if it is desired to increase the distance by which the lens barrel should move to be completely retracted to its storage position, the length of the helicoid-structure must be correspondingly increased and therefore the length as well as the diameter of the lens barrel must be correspondingly increased. If it is desired to reduce the distance, on the other hand, it will be difficult to obtain the camera as thin as desired because the front side of the camera must be correspondingly advanced so as to be flush with the forward end of the lens barrel.

SUMMARY OF THE INVENTION

In view of the problem as described above, it is a principle object of the invention to provide a helicoid-structure allowing, when the helicoid-structure is used as a mechanism to move the lens barrel of a photographic camera back and forth, the distance by which the lens barrel should move to completely retract the lens barrel to its storage position to be increased without resulting in the length and/or the diameter of the lens barrel being correspondingly increased and make it difficult to obtain the camera as thin as desired.

The object set forth above is achieved, according to an aspect of the invention, by a helicoid-structure comprising a combination of troughs, each of appropriate length helically formed in an inner peripheral surface of one cylinder in the form of an outer cylinder or in an outer peripheral surface of the other cylinder in the form of an inner cylinder or column telescopically inserted into the outer cylinder, and crests, each of appropriate length helically formed on the outer peripheral surface of the inner cylinder or on the inner peripheral surface of the outer cylinder so that, when one of these outer and inner cylinders is rotated relative to the other, the combination may convert such rotational motion to the corresponding linear motion. The helicoid-structure is further characterized in that each of the troughs has its width enlarged along a part of its entire helical curve and a length of the part, as measured along its helical curve, is dimensioned to be substantially equal to a length of the crest as measured along its helical curve.

With the helicoid-structure comprising the troughs formed in the inner peripheral surface of the outer cylinder and the crests formed on the outer peripheral surface of the inner cylinder, rotation of the outer cylinder relative to the inner cylinder causes the crest to be slidably moved along the trough and thereby to move the inner cylinder back and forth relative to the outer cylinder. So long as the crest is being guided along the part of the trough other than the width-enlarged part, the inner cylinder linearly moves relative to the outer cylinder with a relatively small uniform increment. However, so long as the crest is being guided along the width-enlarged part, the inner cylinder linearly moves with an increment different from the small uniform increment, since the crest is shifted within the width-enlarged part transversely thereof. The enlarged width of the trough necessarily increases the increment of linear movement per unit rotational angle.

The inner peripheral surface of the outer cylinder may be formed either with the troughs or the crests, so far as the helicoid-structure comprises the combination of these troughs and crests. However, from the viewpoint of a convenience for molding, it is preferred to form the troughs in the inner peripheral surface of the outer cylinder and to form the crests on the outer peripheral surface of the inner cylinder. In view of such aspect, the object set forth above is achieved, according to another aspect of the invention, by a helicoid-structure comprising a combination of troughs each of appropriate length helically formed in an inner peripheral surface of an outer cylinder and crests each of appropriate length helically formed on an outer peripheral surface of an inner cylinder or column telescopically inserted into the outer cylinder so that, when one of said outer and inner cylinders is rotated relative to the other, the combination may convert such a rotational motion to the corresponding linear motion. Each of the troughs has its width enlarged a part of the entire helical curve, and a length of the part as measured along the helical curve is dimensioned to be substantially equal to a length of the crest as measured along the helical curve.

Depending on the particular apparatus or device employing the helicoid structure, the width-enlarged part may be formed along a proximal or distal portion of the entire helical curve defining the trough.

If it is desired to change the increment with which the crest linearly moves relative to the trough at the initial or final stage of this linear motion, the width-enlarged part may be formed along the proximal or distal portion of the entire helical curve. Such an arrangement is suitable for the apparatus or device which requires the inner cylinder to be linearly moved with a predetermined small increment per unit rotational angle along the intermediate portion of the entire helical curve but which is free from any affection by such increment of linear motion per unit rotational angle along the proximal or distal portion of such linear motion.

To adapt the helicoid-structure for the requirement that the increment of linear motion per unit rotational angle should be relatively small along the proximal and distal portions but relatively large along the intermediate portion of the trough, the width-enlarged part may be formed along the intermediate portion of the entire helical curve defining the trough.

With such arrangement in which the trough is continuous from longitudinally opposite ends of the width-enlarged part, the inner cylinder linearly moves in the extent covered by the width-enlarged part with relatively large increment per unit rotational angle, but in the extent not covered by the width-enlarged part, i.e., along the proximal and distal portions of linear motion, with a relatively small increment per unit rotational angle. In this manner, the increment per unit rotational angle with which the inner cylinder linearly moves can be changed en route.

In order that the crest can be guided by the width-enlarged parts with a high stability, the width-enlarged parts have walls oriented obliquely to the direction of the troughs and extending in parallel to one another. In this way, longitudinally opposite ends of the respective crests are necessarily guided by the walls extending in parallel to one another and thereby a stability of their movement is ensured.

According to still another aspect of the invention, the object set forth above is achieved by a helicoid-structure used as an objective driving mechanism in a vari-focusing device of a photographic camera and comprising a combination of troughs helically formed in an inner peripheral surface of a larger-diameter lens barrel and crests helically formed on an outer peripheral surface of a smaller-diameter lens barrel so as to cooperate with the troughs after the smaller-diameter lens barrel has been telescopically received in the larger-diameter lens barrel in such a manner that a relative rotation of these two lens barrels causes the smaller-diameter lens barrel and therefore the objective also to be linearly moved back and forth along the optical axis. Each of the troughs has a width partially enlarged along a proximal or distal portion thereof describing a helical curve and a length of this width-enlarged part as measured along the helical curve is dimensioned to be substantially equal to a length of the crest as measured along the helical curve so that a complete retraction of the smaller-diameter lens barrel may be at least partially achieved by movement of the crests within the width-enlarged parts.

For example, when the smaller-diameter lens barrel functions as a movable lens barrel adapted to move together with the objective held thereby along the optical axis of the objective and the larger-diameter lens barrel functions as a stationary lens barrel fixed to the camera body, rotation of the movable lens barrel causes the crests formed on the movable lens barrel to be guided by the troughs formed in the stationary lens barrel so as to move the movable lens barrel back and forth along the optical axis. A zooming mechanism adapted to drive the objective along its optical axis for vari-focusing can be obtained by designing the helicoid-structure so as to ensure that the objective moves along its optical axis without getting out of a predetermined optical relationship as the movable lens barrel moves relative to the stationary lens barrel. The troughs are formed to extend substantially into a region occupied by the crests when the movable lens barrel has been moved to its photographically effective rearmost position and the width-enlarged parts are formed in an extent by which the movable lens barrel is further retracted from the photographically effective rearmost position to its storage position. As a consequence, the width-enlarged parts advantageously serve to increase an increment per unit rotational angle with which the movable lens barrel is further retracted from the photographically effective rearmost position to its storage position, in comparison with the case in which the movable lens barrel is zoomed under the guidance by the troughs alone. In addition, the length of each width-enlarged part as measured along the helical curve is substantially equal to the length of each crest as measured along the helical curve, and therefore neither the length nor the diameter of the stationary lens barrel must be correspondingly increased as it is required when the movable lens barrel is moved to its storage position under the guidance by the troughs alone. Furthermore, the width-enlarged parts may be used to retract the lens barrel to its storage position to increase a retractable distance thereof, since the movable lens barrel will linearly move by a distance substantially equal to the width of each width-enlarged part. As a result, the forward end of the movable lens barrel can be retracted by such increased distance, and the front side of the camera, to be flush with the forward end, can be also retracted by the correspondingly increased distance, thus allowing the camera to be made in a configuration as thin as expected.

While a high stability of movement is not required for retracting the movable lens barrel to its storage position, it is desirable to retract the movable lens barrel exactly to its storage position. Such requirement is met, according to the invention, by providing the width-enlarged parts with walls, respectively, extending obliquely to the direction in which the respective troughs extend in parallel to one another. With this arrangement, the longitudinally opposite ends of each crest are guided by each pair of the parallel walls and consequently the movement of this crest is stabilized.

Depending on a design of the helicoid-structure, it is also possible for the helicoid-structure to achieve a mutual conversion between rotational motion and linear motion. Such function is achieved, according to yet another aspect of the invention, by a helicoid-structure comprising a combination crests and troughs respectively formed on a pair of cylinders telescopically movable relative to each other so that the combination may convert a rotational motion to a linear motion and vice versa. The helicoid-structure is characterized by that the troughs are partially widened to form width-enlarged parts, respectively, and the crests are guided by walls of the width-enlarged parts extending obliquely to the walls of the respective troughs during movement of the crests within the respective width-enlarged parts.

These and other features, objects, and advantages of the present invention will best be understood by reference to the following description thereof together with reference to the accompanying drawings.

DETAILED DESCRIPTION OF THE PREFERRED EMBODIMENTS

Details of the helicoid-structure according to the invention will be more fully understood from the description of the preferred embodiments given hereunder in reference with the accompanying drawings. In the embodiments described below, the helicoid-structure according to the invention is used as a lens barrel driving means in the zooming mechanism of the photographic camera.

Figure 1:
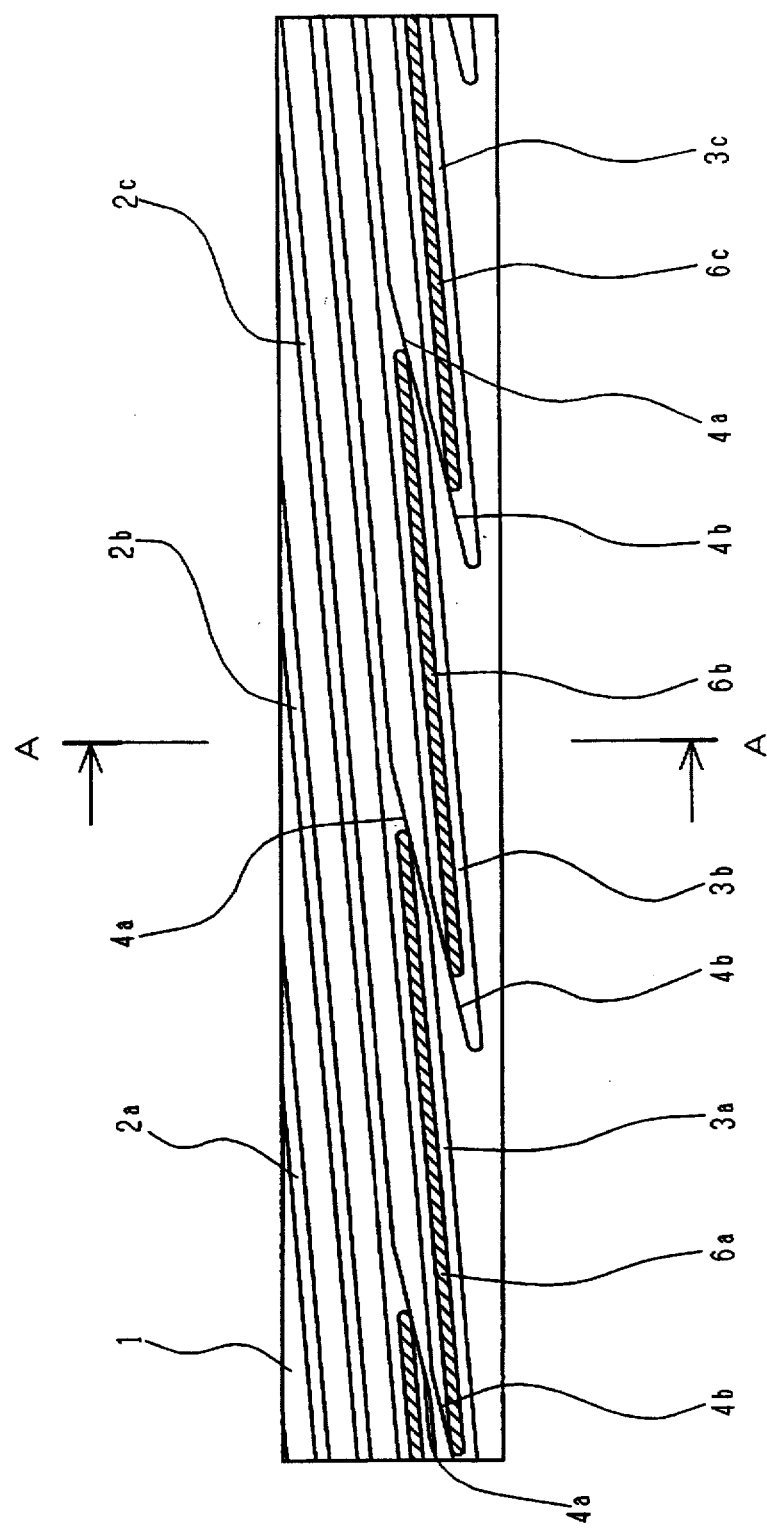
FIG. 1 is a developed view showing the inner peripheral surface of an outer cylinder formed with troughs combined with crests, as indicated by oblique lines, formed on the outer peripheral surface of an inner cylinder to constitute a helicoid-structure according to the invention.

FIG. 1 is a developed view showing an inner peripheral surface of a stationary lens barrel 1 in the form of an outer cylinder provided with a helicoid-structure. The stationary lens barrel 1 is formed in its inner peripheral surface with a plurality of troughs 2 each comprising a groove of appropriate configuration helically (linearly in the developed view) extending between axially opposite ends of the stationary lens barrel 1. In the specific embodiment shown in FIG. 1, there are three troughs 2a, 2b, and 2c extending at regular intervals as viewed axially of the stationary lens barrel 1.

Figure 2:
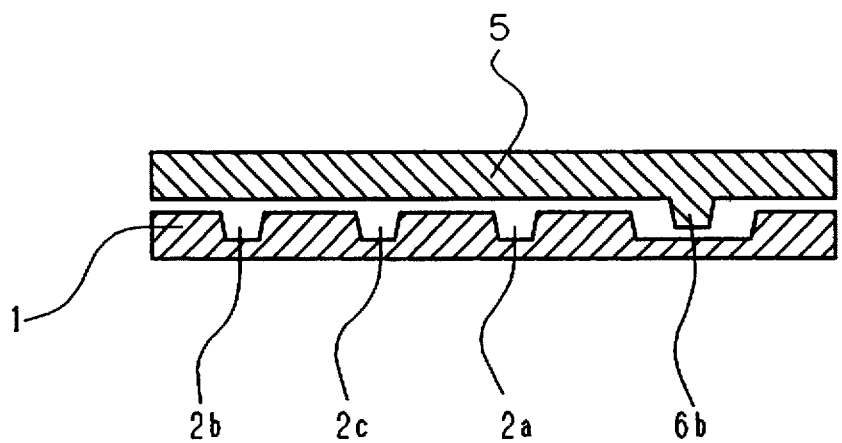
FIG. 2 is a sectional view taken along a line A—A in FIG. 1, showing the inner cylinder also.
Figure 3:
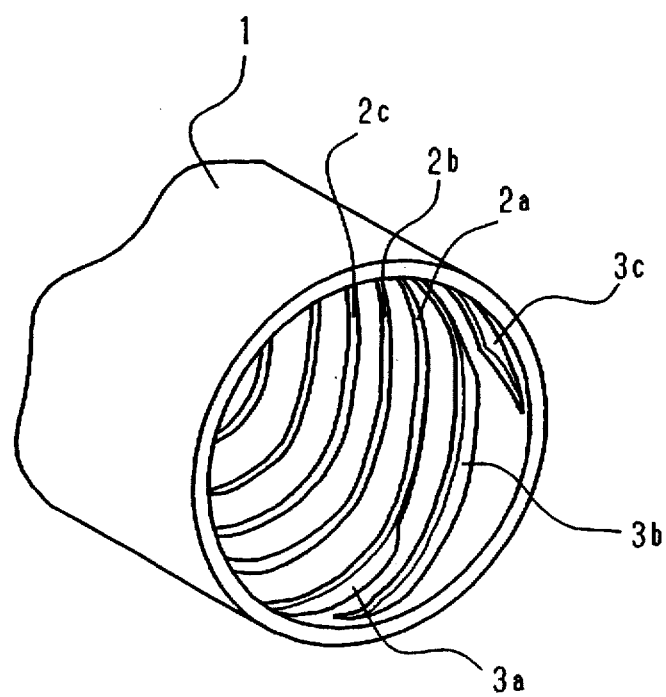
FIG. 3 is a perspective view schematically showing the outer cylinder provided with the helicoid-structure according to the invention.

A movable lens barrel 5 in the form of an inner cylinder adapted to be telescopically received by the stationary lens barrel 1 is formed with crests 6 cooperating with the troughs 2, respectively, as shown by FIGS. 1 and 2. Each of these crests 6 is dimensioned along a helical curve so that not only the respective crests 6a, 6b, and 6c may be inserted into the troughs 2a, 2b, and 2c but also may occupy the corresponding positions in the respective troughs 2a, 2b, and 2c.

The respective troughs 2 formed on the stationary lens barrel 1 are widened along their axially rear terminal parts to form width-enlarged parts 3a, 3b, and 3c, respectively. Each of these width-enlarged parts 3 is formed at its entrance and dead end with walls 4a and 4b extending obliqued across the helical lines along which the respective troughs extend and in parallel to each other in the developed view. These walls 4a and 4b of all the width-enlarged parts 3a, 3b, and 3c extend substantially in parallel to one another. A length of each width-enlarged part 3 as measured along the helical curve is substantially equal to a length of each crest 6 as measured along the helical curve. Accordingly, when the crests 6 are moved within the respective width-enlarged parts 3, the crests 6 are guided by the respective width-enlarged parts 3 with longitudinally opposite ends of each crest 6 kept in contact with the walls 4a and 4b. As has already been described above, the respective crests 6 are synchronously positioned within the respective width-enlarged parts 3a, 3b, and 3c formed by partially widening the respective troughs 2a, 2b, and 2c.

Figure 4:
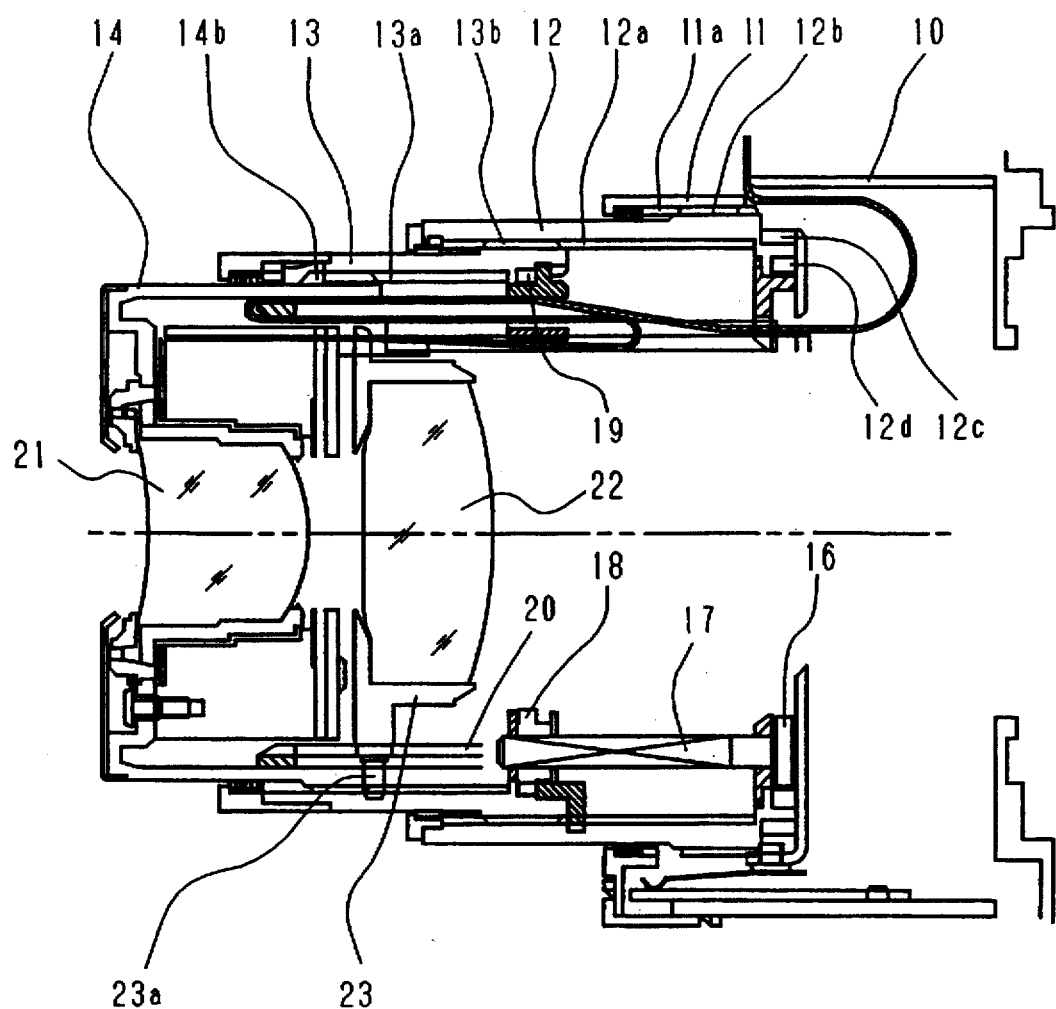
FIG. 4 is an axial sectional view exemplarily showing a photographic camera provided with a zooming mechanism adapted to drive an objective by means of the helicoid-structure according to the invention as an optical system for photographing and having been advanced to its forefront position.
Figure 5:
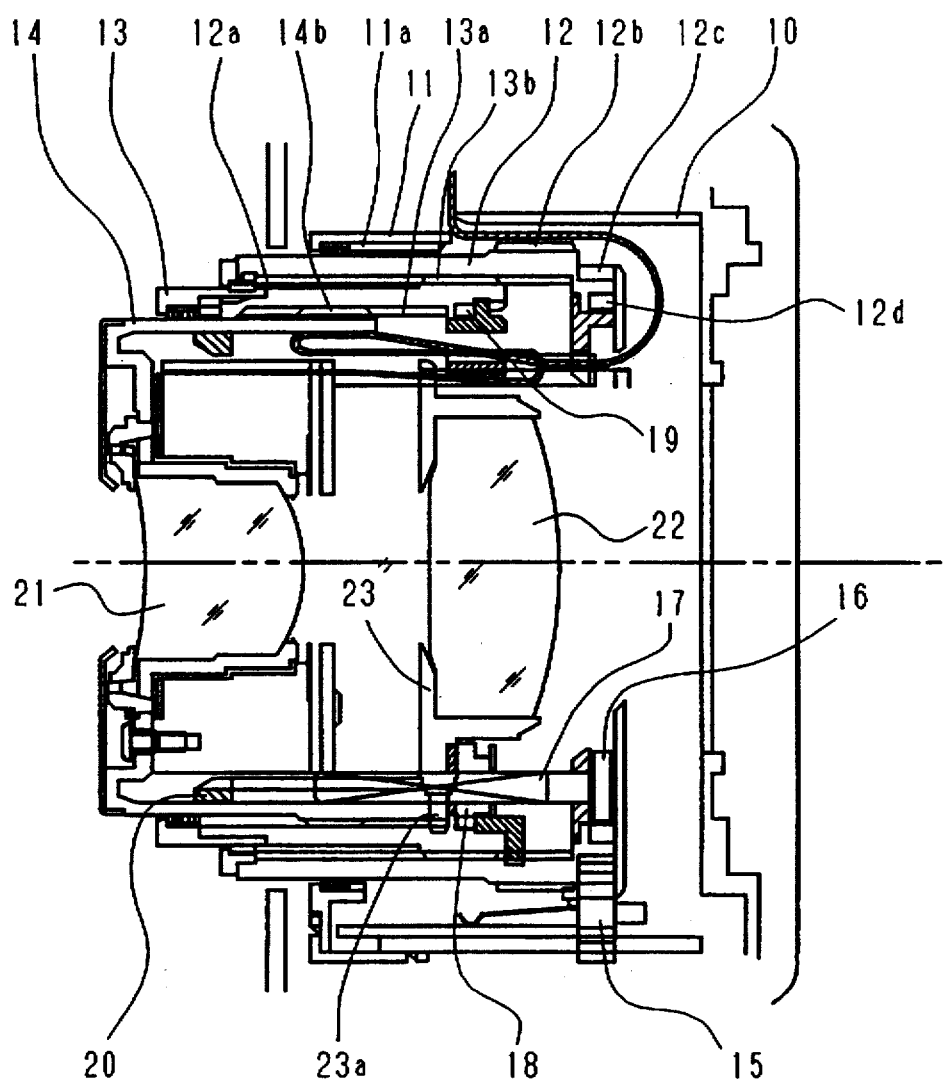
FIG. 5 is a view similar to FIG. 4, but showing the zooming mechanism as the optical system for photographing has been retracted to its photographically effective rearmost position from which the optical system can be further retracted to its storage position.

FIGS. 4 and 5 exemplarily show a photographic camera including a zooming mechanism adapted to drive the objective by means of such helicoid-structure. In order that the camera can be made in a configuration as thin as possible and at the same time a high zoom ratio can be achieved, this camera adopts the helicoid structure according to the invention in its zooming mechanism having a so-called triple stage zoom lens barrel. A stationary lens barrel 11 is fixed to a camera body 10 and is formed in an inner peripheral surface of the stationary lens barrel 11 with female helicoids 11a in the form of troughs. The female helicoids 11a are formed along their rear end portions with the width-enlarged parts. This stationary lens barrel 10 is adapted to receive a first driving lens barrel 12 which has male helicoids 12b provided on its outer peripheral surface in the form of crests. The first driving lens barrel 12 is provided in its inner peripheral surface with female helicoids 12a in the form of troughs. These female helicoids 12 are also formed along their rear end portions with the width-enlarged parts. This first driving lens barrel 12 is adapted to receive a second driving lens barrel 13. The second driving lens barrel 13 is provided on its outer peripheral surface with male helicoids 13b in the form of crests and provided in its inner peripheral surface with female helicoids 13a in the form of troughs. These female helicoids 13a are also formed along their rear end portions with the width-enlarged parts. This second driving lens barrel 13 is adapted to receive a movable lens barrel 14 which is, in turn, provided on its outer peripheral surface with male helicoids 14b in the form of crests.

The outer peripheral surface of the first driving lens barrel 12 is formed around its rear end with an outer gear 12c. As will be apparent from FIG. 5, a gear 15 operatively associated with a driving motor (not shown) is engaged with the outer gear 12c to transmit a rotation of the driving motor to the outer gear 12c and thereby to rotate the first driving lens barrel 12 relative to the stationary lens barrel 11. The inner peripheral surface of the first driving lens barrel 12 is provided around its rear end with an inner gear 12d in the form of an internal gear. A transmission gear 16 is operatively associated with the inner gear 12d via an intermediate gear (not shown) which is rotated in a direction opposite to a direction in which the first driving lens barrel 12 is rotated.

The transmission gear 16 is mounted on a rear end of a transmission shaft 17 which is, in turn, fixed to the inner side of the first driving lens barrel 12 adjacent the rear end of the first driving lens barrel 12 so that said transmission shaft 17 can be moved together with the first driving lens barrel 12. This transmission shaft 17 is adapted rotate in synchronization with the transmission gear 16. The transmission shaft 17 slidably carries thereon a transmission follower gear 18 adapted to rotate in synchronization with the transmission shaft 17. The transmission follower gear 18 is operatively associated with the rear end of the second driving lens barrel 13 so as to move back and forth together with the second driving lens barrel 13. The transmission follower gear 18 is adapted to be engaged with a second lens barrel driving gear 19 in the form of an internal gear provided on the inner peripheral surface of the second driving lens barrel 13 around the rear end thereof. With such arrangement, rotation of the transmission follower gear 18 causes the second driving lens barrel 13 to rotate relative to the first driving lens barrel 12 in the same direction as the transmission gear 16 operatively associated with the transmission follower gear 18 via the transmission shaft 17 but in the direction opposite to the first driving lens barrel 12.

The movable lens barrel 14 is operatively associated with a key member 20 which prevents the movable lens barrel 14 from rotating and permits the movable lens barrel 14 to move back and forth along the optical axis. The key member 20 is operatively associated also with the second driving lens barrel 13 so as to move back and forth together with the second driving lens barrel 13 without rotating. A front lens group 21 is operatively associated with this movable lens barrel 14 and moves back and forth as the movable lens barrel 14 moves back and forth. A rear lens group 22 is held by a frame 23 which is, in turn, provided with a link pin 23a projecting therefrom. The link pin 23a is operatively associated with the key member 20, on one hand, and a cam groove (not shown) formed in the inner peripheral surface of the second driving lens barrel 13 so that a movement of the rear lens group 22 may be controlled by the cam groove. Accordingly, the front lens group 21 and the rear lens group 22 move back and forth with a predetermined optical relationship maintained between these two lens groups 21 and 22 as the movable lens barrel 14 moves back and forth. In this manner, a focal distance of the objective comprising the front lens group 21 and rear lens group 22 is continuously varied.

The helicoid-structure constructed as has been described hereinabove operates as follows. The movable lens barrel 5 is telescopically inserted into the stationary lens barrel 1 so that the troughs 2 on the stationary lens barrel 1 are combined with the respective crests 6 on the movable lens barrel 5. Rotation of the movable lens barrel 5 relative to the stationary lens barrel 1 causes the crests 6 to move under the guidance by the respective troughs 2 and thereby causes a linear motion of the movable lens barrel 5 relative to the stationary lens barrel 1. The crests 6 move along the respective troughs 2 and enter the width-enlarged parts 3. It should be understood that the respective crests 6a, 6b, and 6c occupy the corresponding positions within s the respective troughs 2a, 2b, and 2c and therefore the crests 6a, 6b, and 6c synchronously reach the respective width-enlarged parts 3a and 3b.

Each crest 6 is guided by each pair of walls 4a and 4b of the corresponding width-enlarged part 3 and moves transversely of this width-enlarged part 3 as the movable lens barrel continues to rotate after the crest 6 has reached the width-enlarged part 3. The direction in which the crest 6 moves is a direction extending across the helical curve defining the trough 2, i.e., a direction which is angularly near to the direction of axis of the stationary lens barrel 1. In consequence, an increment of linear movement per unit rotational angle with which the crest 6 linearly moves relative to the stationary lens barrel 1 is larger than an increment with which the crest 6 moves under the guidance by the trough 2 alone. In this manner, the helicoid-structure allows the increment of linear movement per unit rotational angle to be varied en route.

A manner in which the helicoid-structure operates when it is used in a zooming mechanism of a photographic camera will now be described in reference with FIGS. 4 and 5. FIG. 4 shows a state in which both the front lens group 21 and the rear lens group 22 have moved to their forefront position. In this state, the movable lens barrel 14 has moved to its forefront position relative to the second driving lens barrel 13, the second driving lens barrel 13 has moved to its forefront position relative to the first driving lens barrel 12, and the first driving lens barrel 12 has moved to its forefront position relative to the stationary lens barrel 11.

In this state, rotation of the driving motor (not shown) is transmitted to the outer gear 12c of the first driving lens barrel 12 via the gear 15 to rotate the first driving lens barrel 12 relative to the stationary lens barrel 11. It should be understood that the direction in which the first driving lens barrel 12 is rotated at this point in time is assumed as the backward direction. As the first driving lens barrel 12 rotates relative to the stationary lens barrel 11, the male helicoids 12b formed on the outer peripheral surface of the first driving lens barrel 12 move under the guidance by the female helicoids 11a formed in the inner peripheral surface of the stationary lens barrel 11, and consequently the first driving lens barrel 12 is linearly moved backward relative to the stationary lens barrel 11. Rotation of the first driving lens barrel 12 causes the transmission gear 16 operatively associated with the inner gear 12d via the intermediate gear (not shown) to rotate in the direction opposite to the direction in which said first driving lens barrel 12 rotates. On the other hand, the transmission follower gear 18 which is in coaxial relationship with the transmission gear 16 via the transmission shaft 17 rotates in the same direction as the direction in which the transmission gear 16 rotates. Consequently, the second driving lens barrel 13, provided with the second lens barrel driving gear 19 engaged with the transmission follower gear 18, rotates in the same direction as the direction in which the transmission gear 16 rotates. Accordingly, the second driving lens barrel 13 rotates in the direction opposite to the direction in which the first driving lens barrel 12 rotates, i.e., in the forward direction. This means that the second driving lens barrel 13 rotates relative to the first driving lens barrel 12.

Rotation of the second driving lens barrel 13 relative to the first driving lens barrel 12 causes the male helicoids 13b formed on the outer peripheral surface of the second driving lens barrel 13 to move under the guidance by the female helicoids 12a formed in the inner peripheral surface of the first driving lens barrel 12. As a result, the second driving lens barrel 13 moves rearward relative to the first driving lens barrel 12. Since the movable lens barrel 14 is prevented by the key member 20 from rotating, the second driving lens barrel 13 rotates relative to the movable lens barrel 14. In consequence, the female helicoids 13a formed in the second driving lens barrel 13 guide the male helicoids 14b formed on the movable lens barrel 14 which is, in turn, guided by the key member 20 so as to move rearward relative to the second driving lens barrel 13.

In consequence, the movable lens barrel 14 moves rearward relative to the second driving lens barrel 13, the second driving lens barrel 13 moves rearward relative to the first driving lens barrel 12 and the first driving lens barrel 12 moves rearward relative to the stationary lens barrel 11. Since the respective male helicoids 12b, 13b, and 14b are guided by the respective female helicoids 11a, 12a, and 13a during this rearward movement, the first driving lens barrel 12, the second driving lens barrel 13, and the movable lens barrel 14 move with a relatively small uniform increment of linear movement per unit rotational angle. The front lens group 21 moves rearward as the movable barrel 14 moves rearward and the rear lens group 22 moves rearward under the guidance by the cam groove (not shown) so that a predetermined optical relationship can be maintained between these two lens groups.

FIG. 5 shows a state in which the first driving lens barrel 12, the second driving lens s barrel 13, and the movable lens barrel 14 have moved rearward to the photographically effective rearmost position of the objective comprising the front and rear lens groups 21 and 22. In this state, each male helicoid 12b formed on the outer peripheral surface of the first driving lens barrel 12 has reached the rear end of each female helicoid 11a formed in the inner peripheral surface of the stationary lens barrel 11, each male helicoid 13b formed on the outer peripheral 10 surface of the second driving lens barrel 13 has reached the rear end of each female helicoid 12a formed in the first driving lens barrel 12, and each male helicoid 14b formed on the outer peripheral surface of the movable lens barrel 14 has reached the rear end of each female helicoid 13a formed in the inner peripheral surface of the second driving lens barrel 13. From this state, continuous energization of the driving motor rotates the first driving lens barrel 12 in the backward direction until the male helicoids 12b on the first driving lens barrel 12 reach the width-enlarged parts formed along the rear end portions of the female helicoids 11a in the stationary lens barrel 11, the male helicoids 13b on the second driving lens barrel 13 reach the width-enlarged parts formed along the rear end portions of the female helicoids 12a in the first driving lens barrel 12, and the male helicoids 14b on the movable lens barrel 14 reach the width-enlarged parts formed along the rear end portions of the female helicoids 13a in the second driving lens barrel 13. Thereafter, these male helicoids 12b, 13b, and 14b move under the guidance by the respective width-enlarged parts.

The width-enlarged parts are formed by partially widening the respective female helicoids 11a, 12a, and 13a in the direction of the optical axis and therefore the respective male helicoids 12b, 13b, and 14b move in the direction of the optical axis with the correspondingly larger increment of linear movement per unit rotational angle. Thus, the first driving lens barrel 12, the second driving lens barrel 13, and the movable lens barrel 14 linearly move with an increment larger than when the male helicoids move under the guidance by the respective troughs alone. If such rearward movement of the first driving lens barrel 12, the second driving lens barrel 13, and the movable lens barrel 14 under the guidance by the respective width-enlarged parts is used to retract the lens barrel assembly to the storage position, axial lengths as well as diameters of the stationary lens barrel 11, the first driving lens barrel 12, and the second driving lens barrel 13 can be dimensioned smaller than the case in which the respective female helicoids 11a, 12a, and 13a are extended enough to retract the lens barrel assembly to the storage position. This contributes to realization of a compact camera.

To advance the first driving lens barrel 12, the second driving lens barrel 13 and the movable lens barrel 14 from their completely retracted positions to the photographically effective positions, the first driving lens barrel 12 may be rotated in the forward direction. The first driving lens barrel 12 is thereby advanced relative to the stationary lens barrel 11 and the second driving lens barrel 13 is rotated in the backward direction. As a result, a relative rotation occurs between the first driving lens barrel 12 and the second driving lens barrel 13 so as to advance the second driving lens barrel 13 relative to the first driving lens barrel 12. Rotation of the second driving lens barrel 13 causes the movable lens barrel 14 to be advanced relative to the second driving lens barrel 13. In this way, the first driving lens barrel 12, the second driving lens barrel 13, and the movable lens barrel 14 are advanced to their photographically effective positions. The front lens group 21 and the rear lens group 22 also move together with the movable lens barrel 14 to their photographically effective positions as shown by FIG. 5. Such movement of the respective components from their storage positions to their photographically effective positions is performed by the respective male helicoids 12b, 13b, and 14b guided by the respective width-enlarged parts.

Further rotation of the first driving lens barrel 12 in the forward direction causes the respective male helicoids 12b, 13b, and 14b of the first driving lens barrel 12, the second driving lens barrel 13, and the movable lens barrel 14 to be guided by the respective female helicoids 11a, 12a, and 13a, and thereby the respective lens barrels 12, 13, and 14 are advanced from their positions as shown by FIG. 5 to their positions as shown by FIG. 4.

Figure 6:
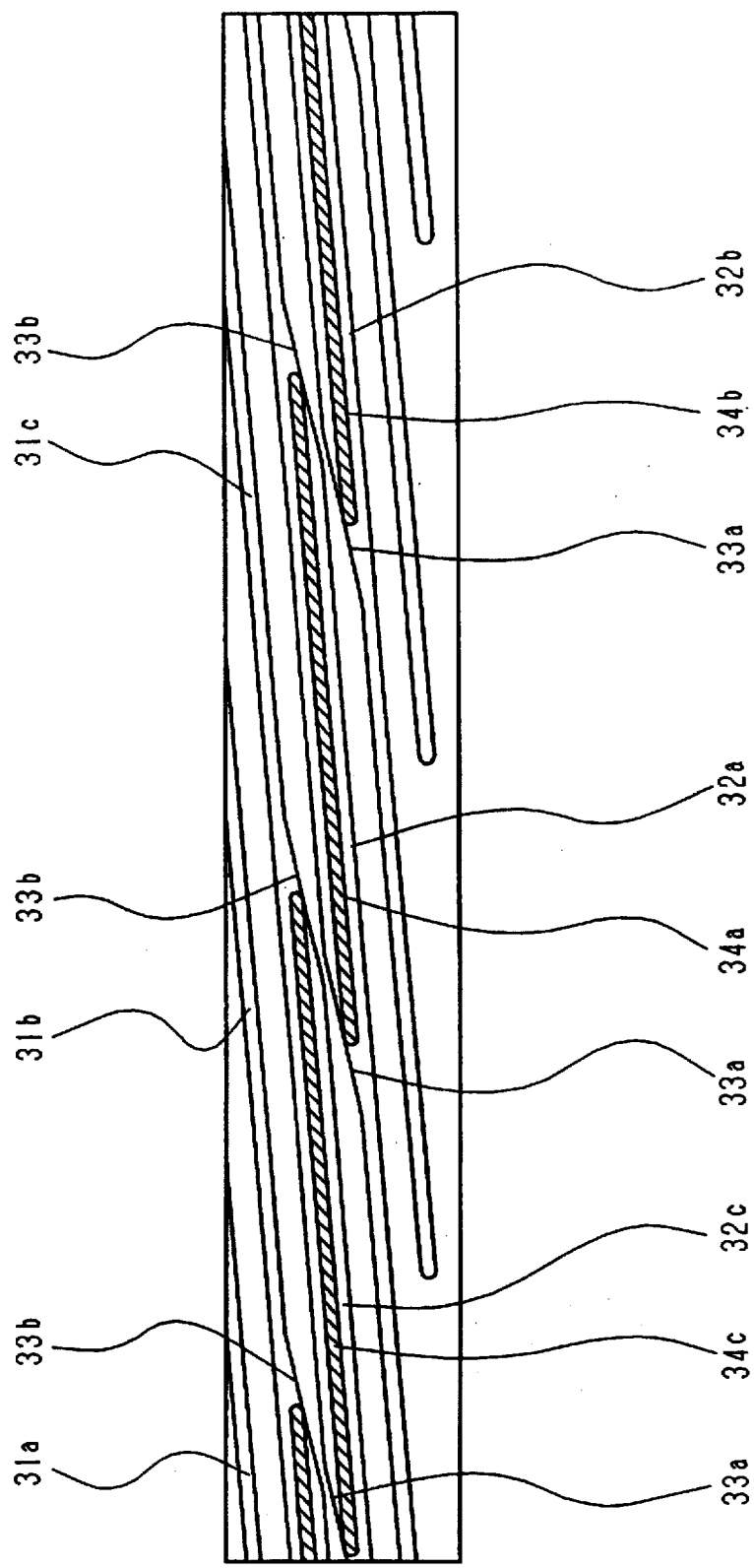
FIG. 6 is a view similar to FIG. 1 showing a variant of the helicoid-structure according to the invention.

In a specific embodiment shown by FIG. 6, three troughs 31a, 31b, and 31c are partially widened along their intermediate portions to form width-enlarged parts 32a, 32b, and 32c. These width-enlarged parts 32a, 32b, and 32c are formed at their entrances and dead ends with walls 33a and 33b extending across the helical curves along which the respective troughs 31 extend (each pair of walls are in parallel to each other in a developed view of FIG. 6). These walls 33a and 33b of all the width-enlarged parts 32a, 32b, and 32c extend substantially in parallel to one another. A length of each width-enlarged part 32 as measured along the helical curve is dimensioned to be substantially equal to a length of each crest 34 as measured along the helical curve. With such arrangement of the walls, each crest 34 having reached the width-enlarged part 32 moves under the guidance by this width-enlarged part 32 with longitudinally opposite ends of this crest 34 kept in contact with the walls 33a and 33b. It should be understood that the respective crests 34a, 34b, 34c synchronously reach the respective width-enlarged parts 32a, 32b, and 32c formed by partially widening the respective troughs 31a, 31b, and 31c.

As will be apparent from FIG. 6, with the helicoid-structure in which the troughs 31 are formed along their intermediate portions with the width-enlarged parts 32, during movement of the inner cylinder formed on its outer peripheral surface with the crests 34 relative to the outer cylinder formed in its inner peripheral surface with the troughs 31, the inner cylinder linearly moves with a relatively small increment per unit rotational angle along proximal and distal end portions of the movement, since the crests 34 are guided by the respective troughs 31 along the proximal and distal end parts of the movement. Along the intermediate portion of the movement, on the other hand, the inner cylinder linearly moves with a relatively large increment per unit rotational angle, since the respective crests 34 are guided by the respective width-enlarged parts 32 along this intermediate portion. The helicoid-structure of such arrangement is useful, for example, to drive the movable lens barrel of a so-called bi-focus system in which the focal distance is changed over between a long focus and a short focus. Specifically, the position of the movable lens barrel must be adjusted on both the short focus side and the long focus side. For such adjustment, the increment of linear movement per unit rotational angle should be relatively small to achieve a fine adjustment. Along the intermediate portion of the linear movement, on the contrary, it is unnecessary to stop the movable lens barrel en route and it is rather preferred to move the movable lens barrel with a relatively large increment of linear movement per unit rotational angle in order to accelerate the transfer of the movable lens barrel between two focuses.

While the invention has been described hereinabove with reference to the specific embodiments in which each trough is formed along one or both end portions, or the intermediate portion thereof with the width-enlarged part or parts, it is also possible without departing from the scope of the invention to provide each trough with a plurality of width-enlarged parts. For example, in the case of a retractable lens barrel assembly of the bi-focus type, it will be advantageous for the compactness of the camera to form the width-enlarged parts along the intermediate portion and the proximal end portion of each trough. In conclusion, the number of the width-enlarged parts to be formed in each trough depends on the desired operation of the helicoid-structure.

As will be apparent from the foregoing description, the helicoid-structure according to the invention characterized by the width-enlarged parts formed by partially widening the respective troughs and these width-enlarged parts allow the crests to be linearly moved with the increment per unit rotational angle different from the increment with which the crests are linearly moved when they are guided by the troughs alone. In this manner, the inner cylinder formed with the crests can be linearly moved relative to the outer cylinder formed with the troughs with different increments of linear movement per unit rotational angle during a continuous relative movement.

It will become apparent to those skilled in the art that various modifications to the preferred embodiments of the invention as described herein can be made without departing from the spirit or scope of the invention as defined by the appended claims.

The embodiments of the invention in which an exclusive property or privilege is claimed are defined as follows:

1. A helicoid-structure comprising:
   an outer cylinder having an inner peripheral surface;
   an inner cylinder telescopically inserted into said outer cylinder and having an outer peripheral surface;
   a plurality of troughs helically formed in one of the inner peripheral surface of said outer cylinder and the outer peripheral surface of said inner cylinder;
   a plurality of crests helically formed on the other of the inner peripheral surface of said outer cylinder and the outer peripheral surface of said inner cylinder so that one of said outer and inner cylinders is rotatable relative to the other of said outer and inner cylinders to convert the rotational motion to a corresponding linear motion; and
   a width-enlarged portion provided with each of the troughs along a portion of the entire helical curve, wherein a length of said portion as measured along the helical curve is dimensioned to be substantially equal to a length of the crest as measured along the helical curve.

2. The helicoid-structure as defined in claim 1, wherein said width-enlarged portion is formed along a distal portion of the helical curve defining each of the troughs.

3. The helicoid-structure as defined in claim 1, wherein said width-enlarged portion is formed along a proximal portion of the helical curve defining each of the troughs.

4. The helicoid-structure as defined in claim 1, wherein said width-enlarged portion is formed along an intermediate portion of the helical curve defining each of the troughs.

5. The helicoid-structure as defined in claim 1, wherein said width-enlarged portion has walls oriented obliquely to the direction of the trough and extending in parallel to each other.

6. A helicoid-structure comprising:
   an outer cylinder having an inner peripheral surface;
   an inner cylinder telescopically inserted into said outer cylinder and having an outer peripheral surface;
   a plurality of troughs helically formed in the inner peripheral surface of said outer cylinder;
   a plurality of crests helically formed on the outer peripheral surface of said inner cylinder, so that one of said outer and inner cylinders is rotatable relative to the other of said outer and inner cylinders to convert the rotational motion to a corresponding linear motion; and
   a width-enlarged portion provided with each of the troughs along a portion of the entire helical curves, wherein a length of the portion as measured along the helical curve is dimensioned to be substantially equal to a length of the crest as measured along the helical curve.

7. The helicoid-structure as defined in claim 6, wherein said width-enlarged portion is formed along a distal portion of the helical curve defining each of the troughs.

8. The helicoid-structure as defined in claim 6, wherein said width-enlarged portion is formed along a proximal portion of the helical curve defining each of the troughs.

9. The helicoid-structure as defined in claim 6, wherein said width-enlarged portion is formed along an intermediate portion of the helical curve defining each of the troughs.

10. The helicoid-structure as defined in claim 6, wherein said width-enlarged portion has walls oriented obliquely to the direction of the trough and extending in parallel to each other.

11. A helicoid-structure for use as an objective driving mechanism in a vari-focusing device of a photographic camera, said helicoid-structure comprising:
    a larger-diameter lens barrel having an inner peripheral surface;
    a smaller-diameter lens barrel telescopically inserted into said larger-diameter lens barrel and having an outer peripheral surface;
    a plurality of troughs helically formed in the inner peripheral surface of said larger-diameter lens barrel;
    a plurality of crests helically formed in the outer peripheral surface of said smaller-diameter lens barrel so as to cooperate with the plurality of troughs such that a relative rotation of said larger-diameter lens barrel and smaller-diameter lens barrel causes said smaller-diameter lens barrel to be linearly moved back and forth along an optical axis to drive an objective;

a width-enlarged portion provided in each of said plurality of troughs along a portion of said troughs defining a helical curve, a length of the width-enlarged portion as measured along the helical curve is dimensioned to be substantially equal to a length of the crest as measured along the helical curve, and a complete retraction of said smaller-diameter lens barrel is at least partially achieved by movement of the crests within the width-enlarged portion.

12. The helicoid-structure used for the objective driving mechanism according to claim 11, wherein each of said width-enlarged portions has walls oriented obliquely to the direction of said troughs and extending in parallel to each other.

13. A helicoid-structure comprising:

a pair of cylinders telescopically movable relative to each other so that a combination of said pair of cylinders may convert between a rotational motion and a corresponding linear motion;

a plurality of troughs formed in a surface of one of said pair of cylinders, said troughs being partially widened to form width-enlarged portions; and a plurality of crests formed on the other of said pair of cylinders, said crests being guided by walls of the width-enlarged portions extending obliquely to the walls of the respective troughs during movement of said crests within the respective width-enlarged portions.

* * * * *

UNITED STATES PATENT AND TRADEMARK OFFICE
CERTIFICATE OF CORRECTION

PATENT NO.  : 5,802,404
DATED       : September 1, 1998
INVENTOR    : Syunji Nishimura It is certified that error appears in the above-identified patent and that said Letters Patent is hereby corrected as shown below:

Inventor: "Syunji Nishimura, Ohmiya, Japan" should be --Syunji Nishimura, Saitama-Ken, Japan--.

Column 8, line 7;
   After "movable lens barrel" insert --5--.

Column 9, line 20;
   Before "barrel 14" insert --lens--.

Column 9, line 26;
   Delete "s".

Column 9, line 34;
   Delete "10".

Signed and Sealed this

Twenty-third Day of February, 1999

*Attest:*

Q. TODD DICKINSON

*Attesting Officer*    *Acting Commissioner of Patents and Trademarks*